(12) United States Patent
Mayeux et al.

(10) Patent No.: US 12,090,818 B2
(45) Date of Patent: Sep. 17, 2024

(54) LAMINATED GLAZING WITH HEATING LAYER AT THE SAME LEVEL OF THE LAMINATED STRUCTURE AS THE MASK OF THE ELECTRIC CURRENT LEADS OF THE HEATING LAYER

(71) Applicant: SAINT-GOBAIN GLASS FRANCE, Courbevoie (FR)

(72) Inventors: Jean-Benoît Mayeux, Saint Jean de Braye (FR); Michel Rouby, Bray en Val (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 276 days.

(21) Appl. No.: 17/787,018

(22) PCT Filed: Dec. 16, 2020

(86) PCT No.: PCT/FR2020/052460
§ 371 (c)(1),
(2) Date: Jun. 17, 2022

(87) PCT Pub. No.: WO2021/123614
PCT Pub. Date: Jun. 24, 2021

(65) Prior Publication Data
US 2023/0013369 A1 Jan. 19, 2023

(30) Foreign Application Priority Data

Dec. 19, 2019 (FR) ........................................ 1914857

(51) Int. Cl.
*B32B 3/10* (2006.01)
*B32B 3/08* (2006.01)
(Continued)

(52) U.S. Cl.
CPC ................ *B60J 1/004* (2013.01); *B32B 3/08* (2013.01); *B32B 7/12* (2013.01);
(Continued)

(58) Field of Classification Search
None
See application file for complete search history.

(56) References Cited

U.S. PATENT DOCUMENTS

2017/0041987 A1 2/2017 Weber et al.
2017/0232713 A1* 8/2017 Mannheim Astete ......................
B32B 17/10788
428/172

FOREIGN PATENT DOCUMENTS

GB 2264452 A * 9/1993 ....... B32B 17/10036
WO WO-2007083038 A2 * 7/2007 ....... B32B 17/10036
(Continued)

OTHER PUBLICATIONS

International Search Report as issued in International Patent Application No. PCT/FR2020/052460, dated Apr. 14, 2021.

*Primary Examiner* — Christopher M Polley
(74) *Attorney, Agent, or Firm* — Pillsbury Winthrop Shaw Pittman LLP

(57) ABSTRACT

A laminated glazing includes a first transparent sheet intended, in the mounting position of the glazing, to constitute the exterior face thereof, a second transparent sheet bonded to the first by an adhesive interlayer, a heating layer supplied with electric current by leads positioned at the periphery of the glazing, and a mask also positioned at the periphery of the glazing between the first transparent sheet and the leads so as to hide the latter from view from the outside in the mounting position of the laminated glazing, wherein the heating layer and the mask are on the same plane of the laminated structure of the glazing.

10 Claims, 2 Drawing Sheets

(51) Int. Cl.
*B32B 7/12* (2006.01)
*B32B 17/10* (2006.01)
*B60J 1/00* (2006.01)

(52) U.S. Cl.
CPC .. *B32B 17/10036* (2013.01); *B32B 17/10128* (2013.01); *B32B 17/10293* (2013.01); *B32B 17/10385* (2013.01); *B32B 17/10779* (2013.01); *B32B 2250/02* (2013.01); *B32B 2307/302* (2013.01); *B32B 2307/412* (2013.01); *B32B 2307/732* (2013.01); *B32B 2605/006* (2013.01)

(56) References Cited

FOREIGN PATENT DOCUMENTS

| | | | |
|---|---|---|---|
| WO | WO-2014174310 A1 * | 10/2014 | ....... B32B 17/10036 |
| WO | WO 2017/103428 A1 | 6/2017 | |

* cited by examiner

[Fig. 1]
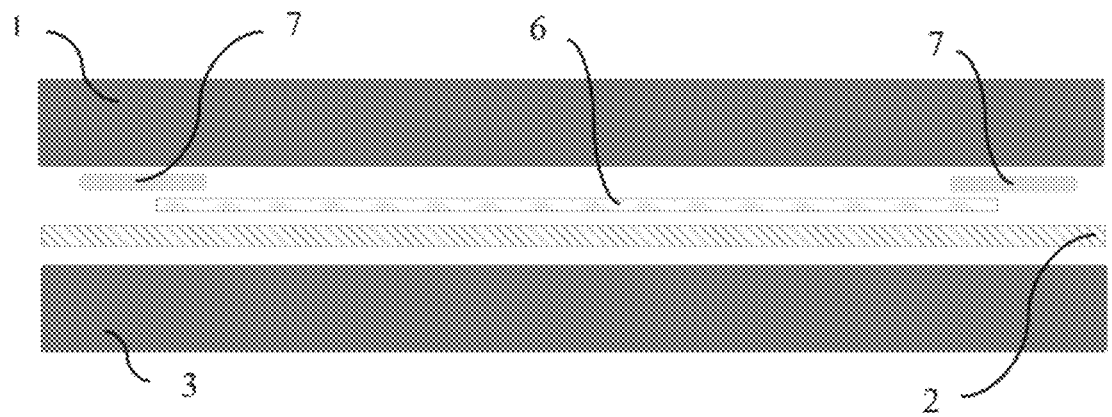
[Fig. 2]
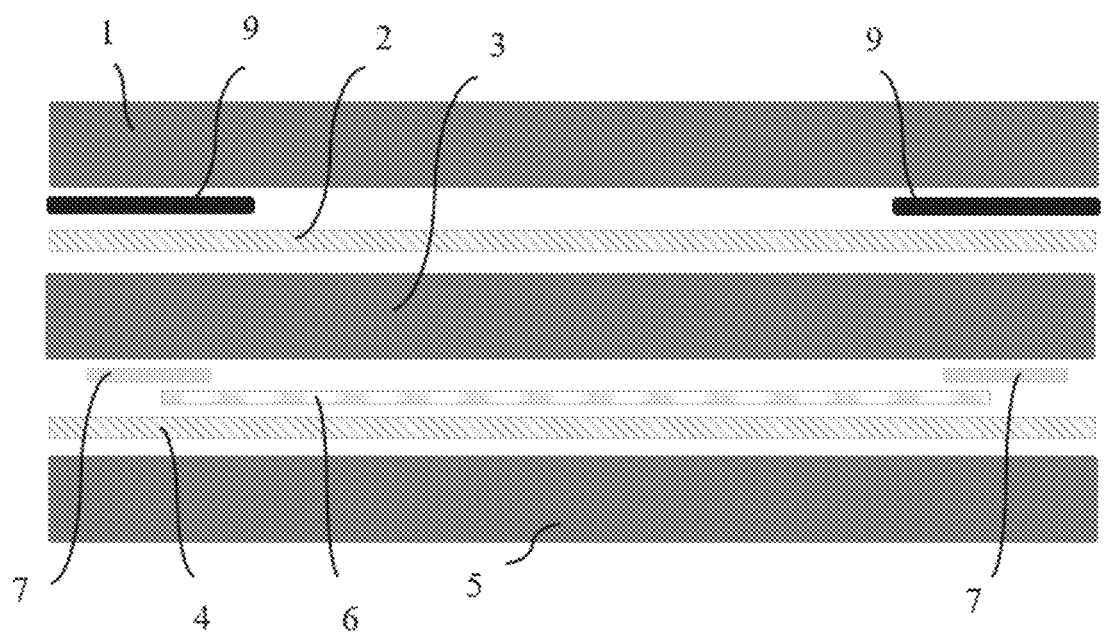

[Fig. 3]
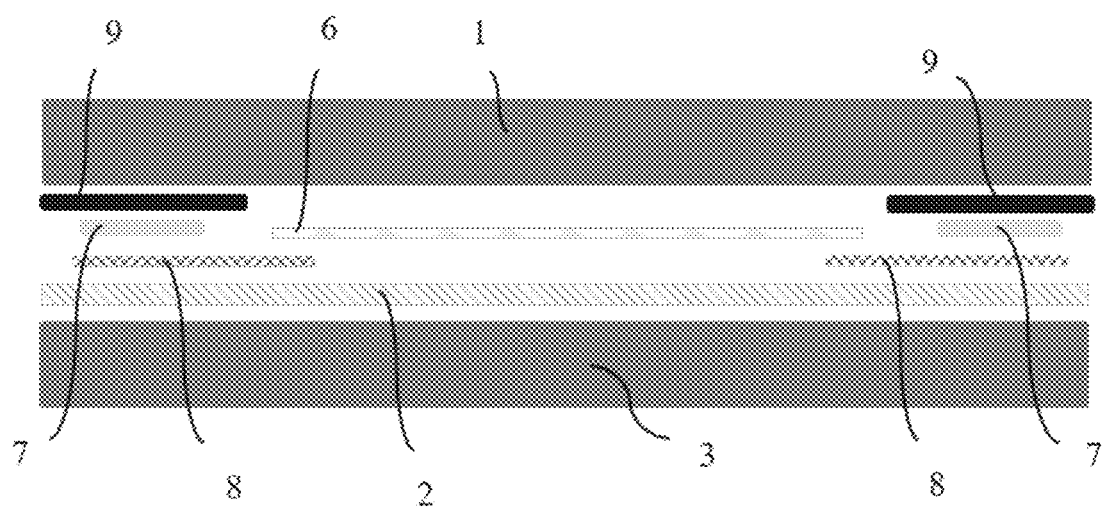

LAMINATED GLAZING WITH HEATING LAYER AT THE SAME LEVEL OF THE LAMINATED STRUCTURE AS THE MASK OF THE ELECTRIC CURRENT LEADS OF THE HEATING LAYER

CROSS-REFERENCE TO RELATED APPLICATIONS

This application is the U.S. National Stage of PCT/FR2020/052460, filed Dec. 16, 2020, which in turn claims priority to French patent application number 1914857 filed Dec. 19, 2019. The content of these applications are incorporated herein by reference in their entireties.

The present invention relates to a laminated glazing with an integrated heating layer, whether this is in view of an application for a terrestrial vehicle, motor vehicle (windshield, back window), railroad vehicle, armored vehicle (including heating side), water-borne vehicle, or for buildings.

Currently, the heating system integrated into the laminated glazing is supplied with power by means of two electric current leads which are themselves integrated into the laminated glazing and positioned at the periphery of the heating system. These leads are positioned in the vision area of the glazing.

These leads may be masked for viewing from the outside atmosphere side but also from the inside of the vehicle or building, by means of a lacquer or an opaque ink, which is for example screen-printed, for esthetic reasons (appearance of the leads) or stealth reasons (light reflection). In this case, the heating system is not on the same plane of the laminated structure (thickness thereof) as the mask. This arrangement has the effect of increasing the volume and the weight of the laminated glazing, which is a drawback.

The heating system is a system with single or multiple layers that may comprise a layer of indium tin oxide (ITO), one or more silver layers.

In the case of sheets of float mineral glass, these sheets have a so-called tin face (in contact with the bath of molten tin) and the other so-called air face which has fewer microcracks than the tin face and is mechanically stronger. For this reason, the air face is positioned preferably toward the interior of the vehicle or building assuming that it is from the outside that an impact is likely to originate, the mechanical strength of the glass being a determining factor in extension on the face of the sheet opposite the impact, i.e. interior face. It is therefore on such an air face of a sheet of mineral glass, in any case on a face of a transparent sheet, oriented toward the interior of the vehicle or building, that the heating layer is deposited. It is of course excluded that the heating layer be directly accessible to the user (since electric current is flowing therein), which requires the lamination of a supplementary transparent sheet toward the interior of the vehicle or building.

On the one hand, the positioning of the mask and of the heating system in two different planes of the laminated structure may lead to the use of three transparent sheets that make the laminated glazing heavy, on the other hand it moves the heating system away from the surface of the glazing in contact with the outside atmosphere, which reduces the effectiveness of its anti-icing function, and/or makes it necessary to increase the heating power.

The inventors have therefore focused simultaneously on the design of a lighter heating glazing, the heating layer of which is closer to the face of the glazing in contact with the outside atmosphere.

For this purpose, one subject of the invention is a laminated glazing comprising a first transparent sheet intended, in the mounting position of the glazing, to constitute the exterior face thereof, a second transparent sheet bonded to the first by means of an adhesive interlayer, a heating layer supplied with electric current by leads positioned at the periphery of the glazing, and a mask also positioned at the periphery of the glazing between the first transparent sheet and the leads so as to hide the latter from view from the outside in the mounting position of the laminated glazing, characterized in that the heating layer and the mask are on the same plane of the laminated structure of the glazing.

By means of the invention, the electric current leads are hidden from view from the exterior of the vehicle or building, without the use of a mask requiring the lamination of a supplementary transparent sheet toward the exterior.

Within the meaning of the invention, the heating layer is of a known type as denoted above, in particular an ITO layer with a thickness of between 50 and 800 nm (R/square between 40 and 2 ohm/square) and comprises, in particular for glazings of complex shapes departing from a rectangle, differentiated heating zones, thickness gradient of the layer, guiding of the current by flow separation lines obtained by laser ablation of the conductive layer, and all known useful improvements.

Preferably, the heating layer and the mask are on the face of the first transparent sheet opposite the one in contact with the outside atmosphere.

Preferably, the leads are directly on the mask.

Preferably, each lead is connected to the heating layer by a transparent conductive film which partially covers the latter. It is a film for instance of polymer material coated with an electrically conductive layer.

Preferably, the first and second transparent sheets are chosen, independently of one another, from a sheet of mineral glass such as soda-lime, aluminosilicate or borosilicate glass, optionally thermally tempered or chemically toughened, and a sheet of organic polymer material such as poly(methyl methacrylate) (PMMA), polycarbonate (PC), polyurethane (PU), polyester such as polyethylene terephthalate) (PET).

These transparent sheets each have a thickness between 0.1 and 20 mm, in particular at most equal to 15, preferably 12 mm. A glazing with an armor-plating function may comprise a first 12-mm transparent sheet of sapphire (crystalline $Al_2O_3$), chemically toughened mineral glass such as aluminosilicate or PMMA, and a second transparent sheet as thin as 0.18 mm thick of PET with a polysiloxane scratch-resistant coating, or from 2.5 to 3 mm thick of PC. A motor vehicle glazing may comprise a first and a second transparent sheet of float mineral glass, for example soda-lime glass that is optionally thermally tempered, having thicknesses equal to or different from one another, not substantially exceeding the range between 1.6 and 2.1 mm. A train glazing may comprise a first transparent sheet made of mineral glass with a thickness of 4 to 6 mm and a second transparent sheet made of mineral glass with a thickness of about 8 mm.

Preferably, the adhesive interlayer is chosen from polyvinyl butyral (PVB), thermoplastic polyurethane (TPU), ethylene-vinyl acetate (EVA). The thickness thereof may be for example from about 0.38 mm in an armored glazing, to 5 to 6 mm thick in a train glazing.

Another subject of the invention is the application of a laminated glazing as described above for a terrestrial vehicle, motor vehicle (windshield, back window), railroad vehicle, armored vehicle (including heating side), water-borne vehicle, or for buildings.

The appended drawings illustrate the invention:

FIG. 1 schematically represents, in cross section, a first laminated glazing from the prior art.

FIG. 2 schematically represents, in cross section, a second laminated glazing from the prior art, FIG. 3 schematically represents, in cross section, a laminated glazing in accordance with the invention.

In FIG. 1, a known first glazing comprises a first sheet of thermally-tempered soda-lime float glass 1 with a thickness of 1.6 mm, intended to be in contact with the outside atmosphere, and a second sheet of thermally-tempered soda-lime float glass 3 with a thickness of 2.1 mm, intended to be in contact with the interior of a motor vehicle. The glass sheets 1 and 3 are bonded by a layer 2 of PVB with a thickness of 0.76 mm. Deposited on the face of the first glass sheet 1 oriented toward the motor vehicle passenger compartment, is a heating conductive layer 6 of ITO with a thickness of 200 nm (sheet resistance of 10 ohm/square), connected to a source of electric current by leads 7 made of copper or silver with a thickness of between 0.2 and 1.5 mm, for example, at the periphery of the laminated glazing, and on the same plane of the laminated structure as the heating layer 6. The leads are in the vision area of the glazing, light can be reflected therefrom in a manner that is dazzling for an observer outside of the motor vehicle.

The first and second glass sheets 1 and 3, and also the layer of PVB 2 in FIG. 2 are identical to those of FIG. 1. However, in FIG. 2, a third sheet of thermally-tempered soda-lime float glass 5 with a thickness of 1.6 mm is bonded to the second 3 by means of a second layer of PVB 4 with a thickness of 0.76 mm. It is in this case on the face of the second glass sheet 3 oriented toward the motor vehicle passenger compartment that, on this same level or plane of the laminated structure, the heating layer 6 and its electric current leads 7, still positioned at the periphery, at two opposite edges of the glazing, are deposited. A mask 9 of screen-printed lacquer is deposited on the face of the first glass sheet 1 oriented toward the motor vehicle passenger compartment, so as to hide the leads 7 from view from the outside of the vehicle.

In accordance with the invention, in FIG. 3, the mask 9 of screen-printed lacquer is also deposited on the face of the first glass sheet 1 oriented toward the motor vehicle passenger compartment, in the same way as the heating layer 6. The leads 7 are deposited directly on the mask 9, like the latter at two opposite edges of the glazing. The heating layer 6 is electrically connected to each lead 7 by a transparent conductive film 8 which partially covers the heating layer 6. The conductive film 8 is sold by the company Eastman under the registered trademark XIR® 70HPS. By means of the invention, the leads are masked from view from the outside of the motor vehicle, in a lightweight laminated structure with only two glass sheets in which structure the heating layer 6 is protected on the face of the exterior glass sheet 1 oriented toward the motor vehicle passenger compartment, as close as possible to the face of the glazing in contact with the outside atmosphere, so as to provide the de-icing function of this face for a minimum heating power.

The invention claimed is:

1. A laminated glazing comprising a first transparent sheet intended, in the mounting position of the glazing, to constitute an exterior face thereof, a second transparent sheet bonded to the first by an adhesive interlayer, a heating layer supplied with electric current by leads positioned at the periphery of the glazing, and a mask also positioned at a periphery of the glazing between the first transparent sheet and the leads so as to hide the leads from view from an outside in the mounting position of the laminated glazing, wherein the heating layer and the mask are on a same plane of the laminated structure of the glazing.

2. The laminated glazing as claimed in claim 1, wherein the heating layer and the mask are on the face of the first transparent sheet opposite the one in contact with the outside atmosphere.

3. The laminated glazing as claimed in claim 1, wherein the leads are directly on the mask.

4. The laminated glazing as claimed in claim 1, wherein each lead is connected to the heating layer by a transparent conductive film which partially covers the latter.

5. The laminated glazing as claimed in claim 1, wherein the first and second transparent sheets are chosen, independently of one another, from a sheet of mineral glass, optionally thermally tempered or chemically toughened, and a sheet of organic polymer material.

6. The laminated glazing as claimed in claim 1, wherein the adhesive interlayer is chosen from polyvinyl butyral (PVB), thermoplastic polyurethane (TPU), ethylene-vinyl acetate (EVA).

7. The laminated glazing as claimed in claim 5, wherein the mineral glass is soda-lime, aluminosilicate or borosilicate glass, and the organic polymer material is poly(methyl methacrylate) (PMMA), polycarbonate (PC), polyurethane (PU), and polyester.

8. The laminated glazing as claimed in claim 7, wherein the organic polymer material is poly(ethylene terephthalate) (PET).

9. A method comprising providing a terrestrial vehicle, motor vehicle, railroad vehicle, armored vehicle, waterborne vehicle, or a building with a laminated glazing as claimed in claim 1.

10. The method as claimed in claim 9, wherein the laminated glazing is a windshield or a back window.

* * * * *